(12) United States Patent
Yamamoto et al.

(10) Patent No.: US 9,527,168 B2
(45) Date of Patent: Dec. 27, 2016

(54) TITANIUM OXIDE RAW MATERIAL FOR WELDING MATERIAL

(75) Inventors: Eri Yamamoto, Fujisawa (JP); Norio Masaie, Fujisawa (JP); Akiyoshi Kataoka, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 611 days.

(21) Appl. No.: 13/990,302

(22) PCT Filed: Jan. 25, 2012

(86) PCT No.: PCT/JP2012/051523
§ 371 (c)(1),
(2), (4) Date: May 29, 2013

(87) PCT Pub. No.: WO2012/108261
PCT Pub. Date: Aug. 16, 2012

(65) Prior Publication Data
US 2013/0248049 A1   Sep. 26, 2013

(30) Foreign Application Priority Data

Feb. 8, 2011 (JP) ................................. 2011-025396

(51) Int. Cl.
| | |
|---|---|
| *B23K 35/362* | (2006.01) |
| *B23K 35/02* | (2006.01) |
| *B23K 35/36* | (2006.01) |
| *B22F 1/02* | (2006.01) |
| *C22C 29/12* | (2006.01) |

(52) U.S. Cl.
CPC .............. *B23K 35/362* (2013.01); *B22F 1/02* (2013.01); *B23K 35/0244* (2013.01); *B23K 35/3601* (2013.01); *B23K 35/3608* (2013.01); *C22C 29/12* (2013.01)

(58) Field of Classification Search
CPC .................................................... B23K 35/362
USPC ........................................................ 148/26
See application file for complete search history.

(56) References Cited

U.S. PATENT DOCUMENTS

| | | | | |
|---|---|---|---|---|
| 3,185,599 | A | * | 5/1965 | Arnold ................ B23K 35/362 148/24 |
| 4,343,984 | A | | 8/1982 | Smith et al. |
| 5,233,160 | A | | 8/1993 | Gordish et al. |
| 2006/0219685 | A1 | | 10/2006 | Karogal et al. |

FOREIGN PATENT DOCUMENTS

| | | |
|---|---|---|
| CN | 101597082 A | 12/2009 |
| EP | 1 710 043 A1 | 10/2006 |
| JP | 47 5361 | 3/1972 |
| JP | 52 6351 | 1/1977 |
| JP | 6 234095 | 8/1994 |
| JP | 2000-254796 | 9/2000 |
| JP | 3816070 | 6/2006 |

OTHER PUBLICATIONS

The Extended European Search Report issued Nov. 24, 2014, in Application No. / U.S. Pat. No. 12744743.1-1353 / 2674242.
Communication pursuant to Rules 70(2) and 70a(2) EPC issued Dec. 11, 2014, in Application No. / U.S. Pat. No. 12744743.1-1353 / 2674242.
International Search Report Issued Apr. 24, 2012 in PCT/JP12/51523 filed Jan. 25, 2012.

* cited by examiner

*Primary Examiner* — Jessee Roe
*Assistant Examiner* — Christopher Kessler
(74) *Attorney, Agent, or Firm* — Oblon, McClelland, Maier & Neustadt, L.L.P.

(57) ABSTRACT

A titanium oxide raw material for a welding material, which can achieve the improvement in a bead shape and high-speed welding. The titanium oxide raw material has the form of particles and has a composition containing 58.0 to 99.0 mass % of TiO2, 2.5 mass % or less of Si, 3.0 mass % or less of Al, 5.0 mass % or less of Mn, 35.0 mass % or less of Fe, 5.0 mass % or less of Mg and 2.0 mass % or less of Ca, wherein the surface of each of the particles is coated with an oxide and/or a composite oxide of at least one element selected from Ti, Fe, Mn, Al and Si and the atom percentages of Ti, Fe, Mn, Al, Si and O in the oxide and/or the composite oxide fulfill the following three formulae.

1=Al+Si=10,

1<Ti/(Fe+Mn)=100,

O/(Fe+Mn)=100

4 Claims, 5 Drawing Sheets

FIG. 2
Fe-Ti-O (concl.)

FIG. 3
Si-Ti-O

FIG. 4
Al₂O₃–TiO₂

FIG. 5
FeO–MnO–TiO₂

FIG. 6
MgO-TiO$_2$

FIG. 7
CaO-TiO$_2$

FIG. 8

TITANIUM OXIDE RAW MATERIAL FOR WELDING MATERIAL

TECHNICAL FIELD

The present invention relates to a titanium oxide raw material for welding materials, the titanium oxide raw material being used as a flux raw material for covered electrodes, flux-cored wires, and fluxes for submerged arc welding.

BACKGROUND ART

A titanium oxide raw material is exemplified as a typical flux raw material for welding materials. Such a titanium oxide raw material is classified into natural minerals such as rutile, leucoxene, and ilmenite and synthetic raw materials on the basis of its chemical composition. Such a natural titanium oxide raw material is sometimes fired for the purpose of decreasing the moisture content so as to be suitable for welding materials (PTLs 1 and 2).

CITATION LIST

Patent Literature

PTL 1: Japanese Unexamined Patent Application Publication No. 2000-254796
PTL 2: Japanese Patent No. 3816070

SUMMARY OF INVENTION

Technical Problem

However, in recent years, demands from users concerning welding workability of covered electrodes and flux-cored wires have become stricter, and the development of welding materials that satisfy these demands has been required. In particular, one of the important demands is to improve a bead shape in vertical up welding.

In submerged arc welding, there are growing demands from users such as for a good shape of a welded bead, that is, stability of bead width and no formation of pockmarks.

In view of the foregoing, it is an object of the present invention to provide a titanium oxide raw material for welding materials that allows an improvement in the bead shape and high speed welding.

Solution to Problem

A particulate titanium oxide raw material for welding materials according to the present invention has a composition including, relative to the total mass of the titanium oxide raw material:
58.0% to 99.0% by mass of $TiO_2$;
2.5% by mass or less of Si;
3.0% by mass or less of Al;
5.0% by mass or less of Mn;
35.0% by mass or less of Fe;
5.0% by mass or less of Mg; and
2.0% by mass or less of Ca,
wherein an oxide and/or a composite oxide of at least one of Ti, Fe, Mn, Al, and Si is present at a surface of each particle, and
atomic percentages of Al and Si in the oxide and/or the composite oxide satisfy the following formula, $1 \leq Al+Si \leq 10$.

In the above paragraph, an oxide of, for example, Ti means an oxide of Ti alone ($TiO_2$) and a composite oxide means a group of multiple types of such oxides and an oxide containing a plurality of metal components such as Ti, Fe, and Mn. A state in which a composite oxide is present at the surface of each titanium oxide raw material particle includes the case where the surface of each particle is composed of a composite oxide.

In the titanium oxide raw material for welding materials, atomic percentages of Al and Si in the oxide and/or the composite oxide preferably satisfy $1.5 \leq Al+Si \leq 6$.

Furthermore, atomic percentages of Ti, Fe, Mn, and O in the oxide and/or the composite oxide preferably satisfy the following two formulae, $1 < Ti/(Fe+Mn) \leq 100$ $O/(Fe+Mn) \leq 100$.

Advantageous Effects of Invention

According to the present invention, the composition of a titanium oxide raw material is optimized and the composition of an oxide and/or a composite oxide present at the surface of each titanium oxide raw material particle is optimized. Therefore, when the titanium oxide raw material according to the present invention is used as a titanium oxide raw material for covered electrodes, flux-cored wires, or submerged arc welding, the conformability and bead shape can be improved and it is also effective to improve the bead shape in submerged arc welding.

DESCRIPTION OF EMBODIMENTS

The present invention will now be described in detail.

First, the inventors of the present invention have considered that a titanium oxide source serving as a raw material that is added in the largest amount as a flux raw material used for covered electrodes or flux-cored wires affects the bead shape, and the inventors have paid attention to a titanium oxide raw material.

The inventors of the present invention have conducted extensive studies on properties of the titanium oxide raw material that affects vertical up welding properties. In general, a bead shape is believed to be affected by the amount and composition of titanium oxide raw material added, the amount, melting point, viscosity, and the like of slag during welding, and the melting point, viscosity, and the like of molten metal. Specifically, if the melting point of slag is excessively high, the slag is quickly solidified and thus the pool size during welding decreases. This makes it difficult to maintain a particular shape of a molten pool during weaving and consequently the bead shape becomes uneven. In contrast, if the melting point of slag is excessively low, the slag is not easily solidified and a weld metal cannot be held by the slag. Thus, the bead shape tends to run down. When the viscosities of slag and molten metal are high, the bead does not easily run down. When the viscosities are low, the bead easily runs down.

Another factor that affects the bead shape is the amount of oxygen contained in molten metal during welding. When the amount of oxygen contained in molten metal increases, the viscosity of the molten metal decreases. Consequently, the molten metal runs down and the bead shape also runs down.

Figure 1:
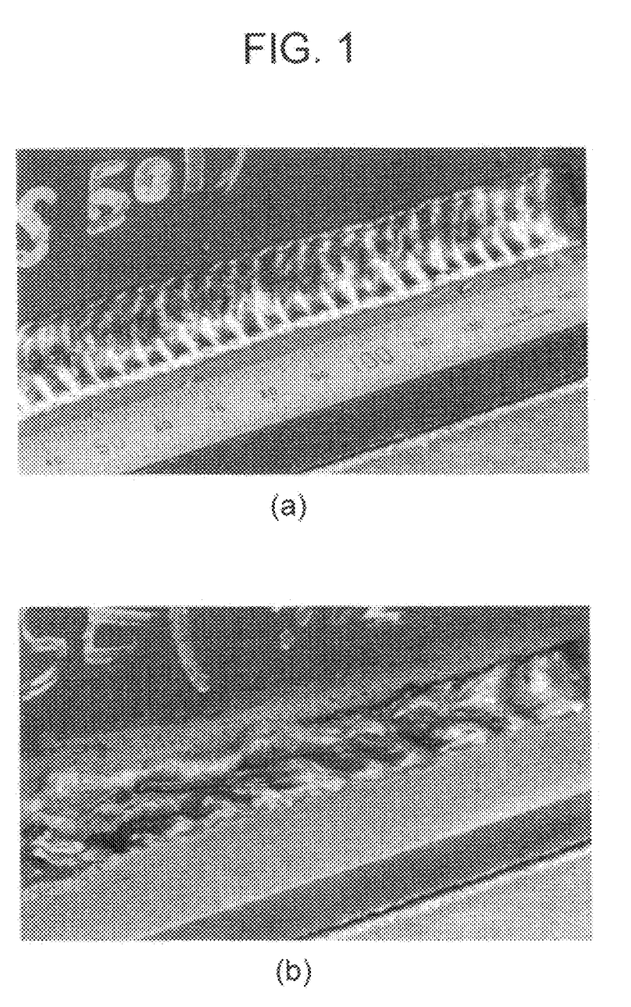
FIG. 1 shows bead shapes in vertical up welding.
Figure 2:
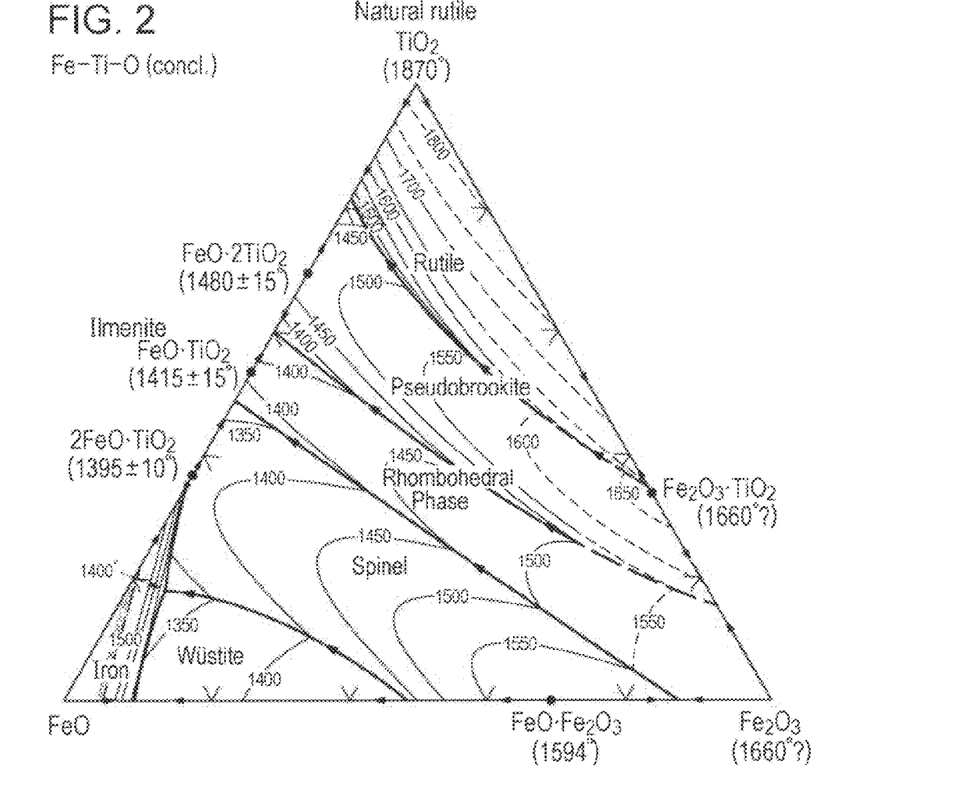
FIG. 2 is a $TiO_2$—FeO—$Fe_2O_3$ phase diagram.

For example, when vertical up welding is performed using a flux-cored wire, a good bead shape is formed as shown in FIG. 1(a) under appropriate welding conditions (current, voltage) under which a high-melting-point raw material such as natural rutile is used. However, when vertical up welding is performed at the same current using a low-melting-point raw material such as ilmenite, a discontinuous bead shape is formed as shown in FIG. 1(b) because of the low melting point and an increase in the amount of oxygen in weld metal due to FeO. As a result, a good bead shape is not formed. FIG. 2 is a $TiO_2$—FeO—$Fe_2O_3$ phase diagram showing the melting points of natural rutile and ilmenite.

However, even if the entire compositions (hereinafter referred to as bulk compositions) of titanium oxide raw materials are the same, a difference is made in terms of the bead shape. As a result of the studies conducted by the inventors of the present invention, they have found that there is a difference in welding workability between a fired titanium oxide raw material and an unfired titanium oxide raw material, both of which have the same bulk composition. As a result of the comparison between a welding material that uses the fired titanium oxide raw material and a welding material that uses the unfired titanium oxide raw material, the welding workability (vertical up welding properties: bead shape, spattering, arc stability) is considerably affected by the production area of the titanium oxide raw material and the firing method and firing conditions.

For example, in the case where vertical up welding is performed using a covered electrode or a flux-cored wire, even if the chemical composition and particle size are the same, there is a considerable difference in spreading of an arc between a fired product and an unfired product. As a result, different bead shapes may be formed. Furthermore, even if the same titanium oxide raw material is used, the firing conditions such as temperature and atmosphere may also cause a considerable difference in spreading of an arc.

The inventors of the present invention have conducted studies focusing on the surface states of the fired titanium oxide raw material and the unfired titanium oxide raw material. Consequently, the inventors of the present invention have found that, regarding the properties of such titanium oxide raw materials, the bead shape is considerably affected by the surface state of each titanium oxide particle, that is, the composition of elements other than Ti that are present at the surfaces of titanium oxide particles rather than the bulk composition of the titanium oxide particles.

Another problem of submerged arc welding is an uneven bead width. The uneven bead width is remarkably caused when a high-melting-point titanium oxide raw material is contained in the flux composition. In this case, when a titanium oxide raw material that satisfies the requirements of the present invention is used, an effect of stabilizing the bead width because of the smooth melting property of the raw material particles has been confirmed. Furthermore, the bead width is stabilized and, at the same time, the welding current is also stabilized. Thus, the correlation of the stability between the welding current waveform and the bead width has been confirmed.

Accordingly, the inventors of the present invention have found the following. The surface composition of the titanium oxide raw material changes, for example, the melting point and the spreading of an arc, which affects the bead shape. By adjusting the physical properties of the surface of the titanium oxide raw material, the welding workability can be improved.

The present invention has been completed based on the above findings. The present invention will now be further described in detail.

As described above, regarding a titanium oxide raw material whose welding workability is improved by performing a firing treatment and a titanium oxide raw material whose welding workability is degraded by performing a firing treatment, there has been no significant difference in chemical composition between before and after the firing. The inventors of the present invention examined the surface chemical composition of titanium oxide raw material particles before and after the firing using an electron probe microanalyzer (EPMA). Since clay minerals (e.g., mica, bentonite, and sericite) and other minerals may adhere to the surfaces of natural titanium oxide raw materials (e.g., rutile, ilmenite, and leucoxene), a sample subjected to ultrasonic cleaning in distilled water was used as a sample for surface analysis. A position, on the surface of the titanium oxide raw material, at which such natural minerals were not present was analyzed.

A qualitative and quantitative analysis of the surface of the titanium oxide raw material was performed in a rectangular analysis region with a size of 10 μm×10 μm using an energy dispersive spectrometer (EDS). It was clarified from the results that each of the atomic percentages (atm %) of Al, Si, Fe, Mn, and O that were present at the surface of the titanium oxide raw material having good welding workability was within a particular range.

In other words, a titanium oxide raw material having good welding workability (bead shape, conformability of a bead) satisfied 1≤Al+Si≤10 and a titanium oxide raw material having better welding workability satisfied 1.5≤Al+Si≤6. A titanium oxide raw material having good welding workability (bead shape) in vertical up welding satisfied 1<Ti/(Fe+Mn)≤100 and O/(Fe+Mn)≤100. That is, it is assumed that the change in the ratio (atm %) of elements such as Al, Si, Fe, Mn, and O that are present at the surface of the raw material affects the welding workability.

The results of studies on the unfired raw material will now be described. It has been conventionally considered that a titanium oxide raw material containing a smaller amount of impurities has good welding workability. However, it has been found that, when a titanium oxide raw material produced in a production area different from before is used because of the recent rise in prices and unavailability of titanium oxide raw materials, there is a titanium oxide raw material whose welding workability is degraded despite the fact that the $TiO_2$ purity is higher than that of a known raw material. For the purpose of comparing the titanium oxide raw material whose welding workability is degraded despite the fact that the $TiO_2$ purity is high with a raw material produced in a known production area, the surface chemical compositions of the raw materials have been studied.

It has been found from the results that the welding workability is affected by the ratio (atm %) of elements of oxides and/or composite oxides present at the surfaces of particles, but not the purity of the titanium oxide raw material. Good welding workability (bead shape, conformability of a bead) is achieved when the titanium oxide raw material satisfies $1 \leq Al+Si \leq 10$. Better welding workability is achieved when the titanium oxide raw material satisfies $1.5 \leq Al+Si \leq 6$. Good welding workability (bead shape) in vertical up welding is achieved when the titanium oxide raw material satisfies $1 < Ti/(Fe+Mn) \leq 100$ and $O/(Fe+Mn) \leq 100$.

Figure 3:
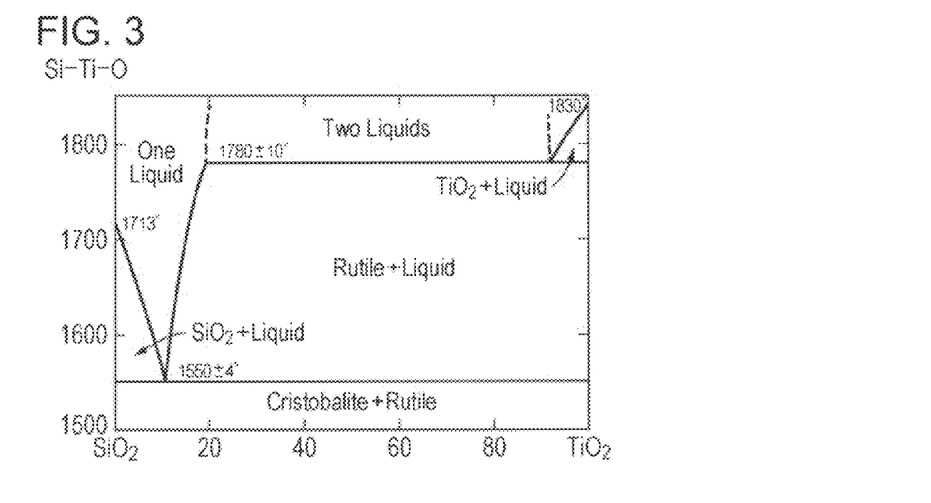
FIG. 3 is an $SiO_2$—$TiO_2$ phase diagram.
Figure 4:
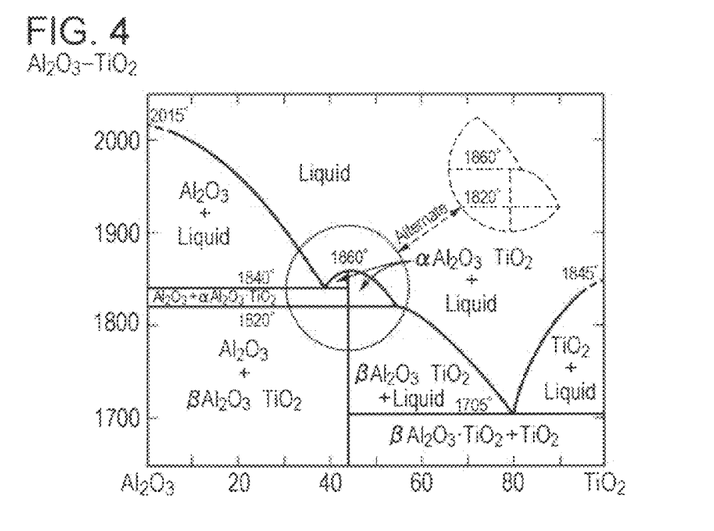
FIG. 4 is an $Al_2O_3$—$TiO_2$ phase diagram.
Figure 5:
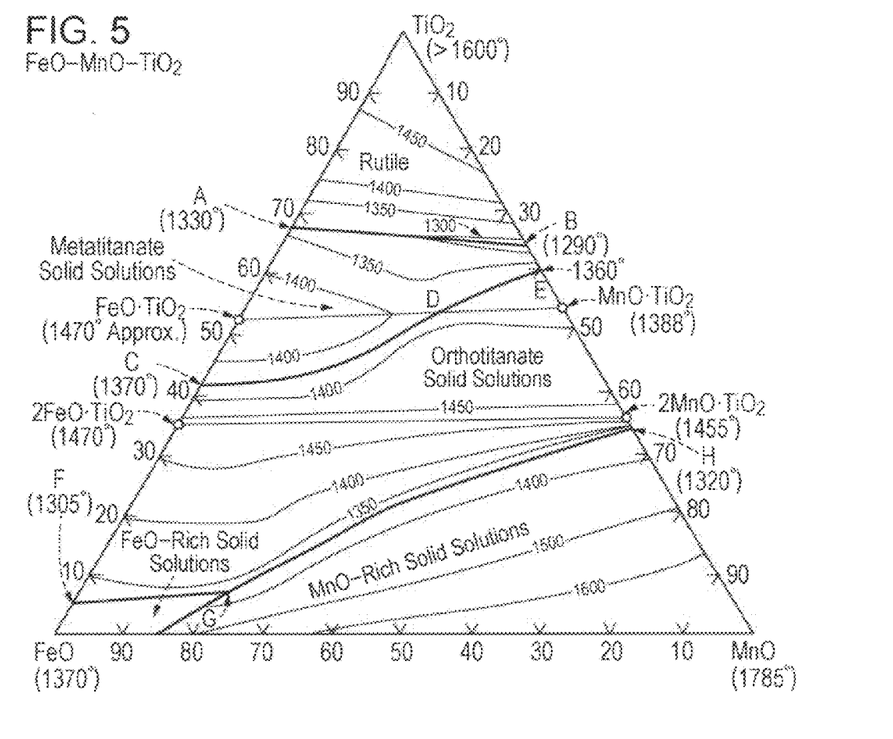
FIG. 5 is an FeO—MnO—$TiO_2$ phase diagram.
Figure 6:
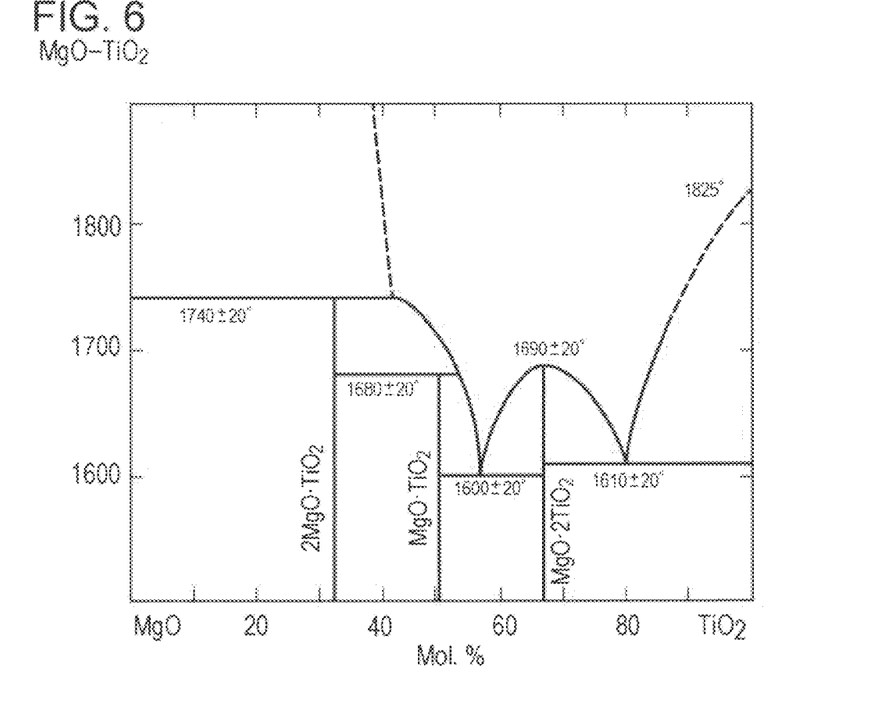
FIG. 6 is an MgO—$TiO_2$ phase diagram.
Figure 7:
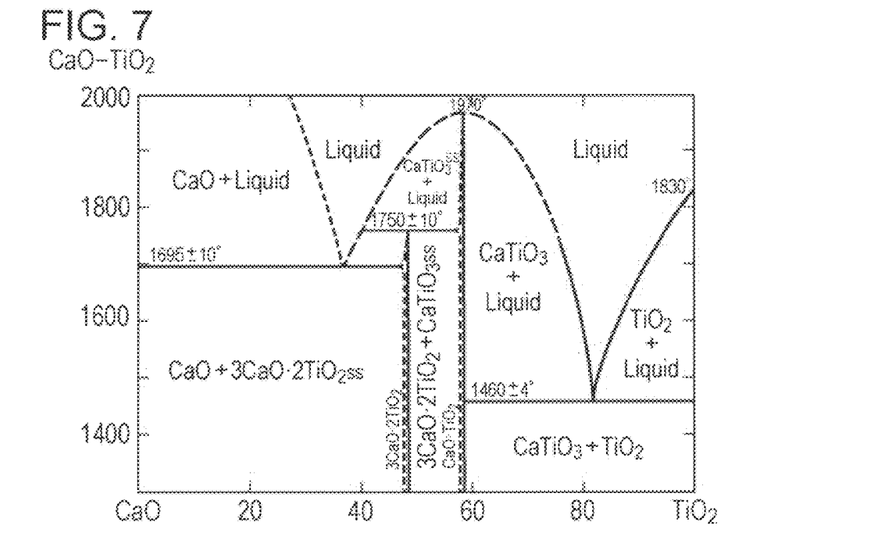
FIG. 7 is a CaO—$TiO_2$ phase diagram.

The surface chemical composition of the titanium oxide raw material that affects vertical up welding workability will now be described. Examples of physical properties of a flux raw material that affect welding workability include a melting point, viscosity, and surface tension. In the present invention, since the melting point of raw material particles is considered to be a dominant factor, a phase diagram (Ernest M. Levin, Carl R. Robbins and Howard F. Mcmurdie/Phase Diagrams for Cermists./The American Ceramic Society 1964) has been examined first. FIG. 3 is an $SiO_2$—$TiO_2$ phase diagram. FIG. 4 is an $Al_2O_3$—$TiO_2$ phase diagram. FIG. 5 is an FeO—MnO—$TiO_2$ phase diagram. As is clear from FIGS. 3 to 5, it is assumed that the surface of the titanium oxide raw material is quickly melted during welding because of oxides of Al, Si, Fe, and Mn that are present at the surface of the titanium oxide raw material, the titanium oxide raw material itself is then melted, and furthermore the entire flux is melted in a facilitated manner, which provides good spreading of an arc and good arc stability. The same effects are also confirmed regarding Ca and Mg. FIG. 6 is an MgO—$TiO_2$ phase diagram and FIG. 7 is a CaO—$TiO_2$ phase diagram. The above phase diagrams are cited from Phase Diagrams for Ceramists Ernest M. Levin et. al, The American Ceramic Society, inc.

By ensuring the spreading and stability of an arc, the bead shape and conformability are improved. Herein, the spreading and stability of an arc concerning a flux raw material are considered to be as follows. Part of a welding material is ionized during welding by releasing electrons to form an arc (plasma). In this case, ease of release of electrons is determined based on the work function. If the work function is low, electrons are easily released into the plasma with low energy and thus the amount of electrons present in the arc increases. The increase in the amount of electrons widens the channel of electrons (i.e., electricity) and also increases the electron density, and thus electricity is easily conducted. As a result, the arc is spread and the arc stability is improved. As shown in "Thermionic emission properties" in Table 3 of p 212 of The Oxide Handbook edited by Samsonov—Physical and Chemical Properties—and Table 1.3.2 of K. Ando and M. Hasegawa, Welding Arc Phenomenon, SANPO PUBLICATIONS, INC, the work functions of metals such as Al, Si, Fe, and Mn and oxides of Al, Si, Fe, and Mn are generally low compared with $TiO_2$. Therefore, by adding metals such as Al, Si, Fe, and Mn and oxides of Al, Si, Fe, and Mn, an arc is easily spread and good arc stability is achieved.

Regarding Al and Si, in addition to the above effect, an effect of improving the conformability of a bead has been confirmed. This may be because the viscosity increases as the amounts of Al and Si increase.

As described above, the bead shape is improved by controlling the chemical composition of the titanium oxide raw material itself, in particular, the chemical composition at the surface of the titanium oxide raw material particle. The form of Al, Si, O, Fe, and Mn present at the surface of the titanium oxide raw material is considerably important. Therefore, the form of these trace elements is controlled to achieve a melting point lower than that of rutile but higher than that of ilmenite and also to achieve the melting point, the viscosity, and the amount of oxygen of slag and molten metal in a balanced manner, whereby a good bead shape can be formed.

The reason for the limitation of a bulk chemical composition of the titanium oxide raw material for welding materials will now be described.

"$TiO_2$: 58.0% to 99.0% by mass"

The $TiO_2$ content is important for holding a weld metal. In vertical up welding, if the $TiO_2$ content is less than 58.0% by mass, the amount of slag is insufficient and the bead runs down. If the $TiO_2$ content is more than 99.0% by mass, the melting point becomes excessively high and the slag is quickly solidified, which decreases the pool size during welding. Therefore, when weaving is performed in vertical up welding, it is difficult to maintain a particular molten pool shape, resulting in formation of an uneven bead shape. Accordingly, the $TiO_2$ content is set to be 58.0% to 99.0% by mass. In general, a titanium oxide raw material with a high $TiO_2$ content has a high melting point. Therefore, such a titanium oxide raw material is suitable for vertical welding and a titanium oxide raw material with a low $TiO_2$ content is suitable for fillet welding.

"Si: 2.5% by mass or less, Al: 3.0% by mass or less, Mn: 5.0% by mass or less"

Oxides (including oxides and/or composite oxides and carbonates) of Si, Al, and Mn are added to adjust the viscosity of slag. However, oxides (including oxides and/or composite oxides and carbonates) serving as Si, Al, and Mn sources are generally added to a flux by using other raw materials (e.g., silica sand, alumina, manganese carbonate, and manganese dioxide) without using a titanium oxide source. High Si, Al, and Mn contents in the titanium oxide source affect the mechanical performance and the viscosity of slag. Therefore, the Si content is set to be 2.5% by mass or less, the Al content is set to be 3.0% by mass or less, and the Mn content is set to be 5.0% by mass or less.

"Fe: 35.0% by mass or less"

If the content of Fe in the oxides, composite oxides, and carbonates is increased, the melting point decreases and thus the molten metal easily runs down. Therefore, in general, a fillet welding material preferably has a high Fe content and a vertical up welding material preferably has a low Fe content. For the purpose of using the titanium oxide source as a raw material for both fillet welding and vertical welding, the Fe content needs to be set to be 35.0% by mass or less.

"Mg: 5.0% by mass or less, Ca: 2.0% by mass or less"

The raw materials in the present invention contain impurities such as Mg and Ca. Since the titanium oxide raw material is produced from natural raw materials (rutile, ilmenite, and leuxocene), the titanium oxide raw material according to the present invention also inevitably contains Mg and Ca (including oxides, composite oxides, and carbonates). If the Mg and Ca contents are high, the amount of spatters increases. Therefore, the Mg content needs to be set to be 5.0% by mass or less and the Ca content needs to be set to be 2.0% by mass or less.

The surface state of the titanium oxide raw material particles needs to satisfy mathematical formulae 1 to 3 below determined from the results of surface analysis conducted by a predetermined analysis method. Specifically, in energy dispersive X-ray spectroscopy (EDX), a raw material (about 3 g) is placed on carbon tape (C tape) attached to an aluminum base, five particles each having a relatively flat region (rectangular region with a size of 10 μm×10 μm) on its surface at high magnification (about 2000 times), the region including no foreign substances (no substances adhere to the surface), are randomly selected, and the atomic weight ratio in one field of view is measured for each of the five particles. The values of the mathematical formulae 1 to 3 below were determined from the five measurement results to determine the average of the values of each of the mathematical formulae 1 to 3. Herein, the calculation of the mathematical formulae 2 and 3 is performed by independently determining an arithmetic mean of five results for each of a numerator and a denominator and dividing the arithmetic mean of the numerator by the arithmetic mean of the denominator. When the arithmetic mean of the denominator is zero (five results are all zero), the values of the mathematical formulae 2 and 3 are infinite. The titanium oxide raw material of the present invention was able to be evaluated by this measurement method.

$x = Al + Si$ (Mathematical Formula 1)

$y = Ti/(Fe+Mn)$ (Mathematical Formula 2)

$z = O/(Fe+Mn)$ (Mathematical Formula 3)

In the mathematical formula 1, x is 1 to 10. As shown in FIGS. 4 and 5, the Al and Si contents relative to the $TiO_2$ content affect the melting point of the titanium oxide raw material. When the value x of the mathematical formula 1 is 1 to 10, there is no particular difference in the bead shape. However, if the value x is more than 10, the melting point of the titanium oxide raw material decreases and a convex bead is formed during vertical up welding. If the value x is less than 1, the melting point of the titanium oxide raw material is excessively high and thus an uneven bead shape is formed. Therefore, x is set to be 1 to 10, and the conformability of a bead is particularly good when x is 1.5 to 6.

The value y of the mathematical formula 2 is preferably more than 1 and 100 or less. As shown in FIG. 3, the Fe and Mn contents relative to the $TiO_2$ content affect the melting point of the titanium oxide raw material. If the value y of the mathematical formula 2 is 1 or less, the Ti content decreases and the contents of Fe and Mn, which have a low melting point, increase. Therefore, the melting point of the titanium oxide raw material decreases and a weld metal easily runs down, resulting in formation of a convex bead. If the value y is more than 100, the melting point of the titanium oxide raw material increases and the slag is quickly solidified. The pool size during welding decreases, which makes it difficult to control the molten pool shape in vertical up welding. Consequently, a poor bead shape is formed. Therefore, y is set to be more than 1 and 100 or less.

The value z of the mathematical formula 3 is preferably 100 or less. If the value z is more than 100, the content of oxygen in a weld metal is excessively increased and the viscosity is decreased. Consequently, the bead easily runs down in vertical up welding, resulting in formation of a convex bead. Therefore, z is set to be 100 or less.

The contents of other components in the titanium oxide raw material is as follows. The Nb and V contents are preferably 0.30% by mass or less from the viewpoint of ensuring toughness at low temperature and preventing SR cracking (stress corrosion cracking). The S content is preferably 0.100% by mass or less from the viewpoint of preventing hot cracking. The P content is preferably 0.050% by mass or less from the viewpoint of preventing hot cracking. The C content is preferably 0.40% by mass or less from the viewpoint of preventing hot cracking and improving workability.

EXAMPLES

Example A

Advantageous effects of Examples that fall within the scope of the present invention will now be described in comparison with Comparative Examples that fall outside the scope of the present invention. The following analyzers were used.

(1) First Analyzer

Analyzer: WD/ED combined electron probe microanalyzer (EPMA) JXA-8200 manufactured by JEOL Ltd.

Analysis conditions: accelerating voltage 15 kV, probe current $5 \times 10^{-10}$ A (2) Second Analyzer Analyzer: Scanning electron microscope with EDS S-3700N manufactured by Hitachi High-Tech Fielding Corporation EDS: GENESIS 400 series manufactured by EDAX Japan Analysis conditions: accelerating voltage 15 kV, probe current $5 \times 10^{-12}$ A The analysis was performed with the first and second EDX analyzers, but the analysis results were the same.

(3) Quantitative Analysis Method

The quantitative analysis was performed by a pure standard method.

The concentration of each element was calculated from the intensity ratio of a standard sample and a real sample.

The analysis method is as follows. In the EDX, a raw material (about 100 mg) was placed on C tape (conductive tape for SEM, carbon double-sided tape manufactured by Nisshin EM Corporation) attached to an aluminum base, and then the raw material was made to thoroughly adhere to the C tape with powder paper, a glass plate, or a stainless microspoon. Osmium (Os) was deposited to ensure an electrical conduction property, five particles each having a relatively flat region (rectangular region with a size of 10 μm×10 μm) on its surface at high magnification (about 2000 times), the region including no foreign substances present thereon or adhering thereto, were randomly selected, and the atomic percentage (atm %) in one field of view was measured for each of the five particles.

Analysis conditions: energy full scale 20 keV (10 eV/ch, 2 Kch)

Effective time: 60 seconds

Accelerating voltage: 15.0 kV

Probe current: $5.0 \times 10^{-10}$ A

The values x, y, and z of the mathematical formulae 1 to 3 are calculated as follows. The values of the mathematical formulae 1 to 3 are determined from the five measurement results to determine the average of the five results for each of the values x, y, and z.

The calculation of the mathematical formulae 2 and 3 is performed by independently determining an arithmetic mean of five results for each of a numerator and a denominator and dividing the arithmetic mean of the numerator by the arithmetic mean of the denominator. When the arithmetic mean of the denominator is zero (five results are all zero), the values of the mathematical formulae 2 and 3 are infinite.

A method for producing a titanium oxide raw material serving as a sample material will now be described. The production method is broadly classified into a firing method and a melting method. A high Fe content is achieved when a firing method is employed. A low Fe content is achieved when a melting method is employed. A raw material for fillet welding (preferably having a high Fe content) and a raw material for vertical welding (preferably having a low Fe content) were produced by properly using the production methods and titanium raw materials. Tables 1 and 2 show the bulk compositions of titanium oxide raw material Nos. 1 to 32.

TABLE 1

|  | No. | Titanium oxide raw material | TiO$_2$ | ZrO$_2$ | SiO$_2$ | Si | C | P | S | Fe | Mn |
|---|---|---|---|---|---|---|---|---|---|---|---|
| Example | A1 | 1 | 93 | 1.0 | 1.9 | 0.9 | 0.01 | 0.001 | 0.077 | 1.7 | 2.0 |
|  | A2 | 2 | 93 | 0.4 | 0.9 | 0.4 | 0.01 | 0.001 | 0.003 | 0.8 | 1.8 |
|  | A3 | 3 | 59 | 0.4 | 1.4 | 0.6 | 0.15 | 0.029 | 0.012 | 33.7 | 0.8 |
|  | A4 | 4 | 90 | 0.6 | 2.1 | 1.0 | 0.03 | 0.001 | 0.012 | 2.6 | 0.7 |
|  | A5 | 5 | 60 | 0.0 | 1.1 | 0.5 | 0.33 | 0.011 | 0.018 | 32.3 | 1.7 |
|  | A6 | 6 | 59 | 0.2 | 1.7 | 0.8 | 0.21 | 0.017 | 0.056 | 34.8 | 2.6 |
|  | A7 | 7 | 92 | 0.6 | 1.4 | 0.7 | 0.01 | 0.001 | 0.050 | 1.5 | 2.1 |
|  | A8 | 8 | 92 | 0.4 | 2.0 | 0.9 | 0.01 | 0.001 | 0.011 | 1.9 | 0.9 |
|  | A9 | 9 | 92 | 0.4 | 1.4 | 0.6 | 0.01 | 0.001 | 0.032 | 1.6 | 2.0 |
|  | A10 | 10 | 92 | 0.1 | 1.8 | 0.8 | 0.07 | 0.001 | 0.035 | 4.3 | 0.5 |
|  | A11 | 11 | 68 | 0.2 | 0.4 | 0.2 | 0.13 | 0.033 | 0.010 | 28.1 | 1.0 |
|  | A12 | 12 | 94 | 0.5 | 1.2 | 0.6 | 0.10 | 0.001 | 0.082 | 1.2 | 1.7 |
|  | A13 | 13 | 66 | 0.2 | 1.1 | 0.5 | 0.15 | 0.035 | 0.008 | 27.0 | 1.7 |
|  | A14 | 14 | 93 | 0.6 | 1.6 | 0.8 | 0.01 | 0.001 | 0.050 | 2.4 | 2.2 |
|  | A15 | 15 | 95 | 0.4 | 1.4 | 0.6 | 0.01 | 0.001 | 0.124 | 2.1 | 2.1 |
|  | A16 | 16 | 94 | 0.2 | 1.1 | 0.5 | 0.01 | 0.001 | 0.016 | 1.2 | 1.2 |
|  | A17 | 17 | 88 | 0.4 | 1.4 | 0.6 | 0.01 | 0.001 | 0.012 | 2.3 | 0.8 |
|  | A18 | 18 | 92 | 0.2 | 2.0 | 0.9 | 0.00 | 0.001 | 0.029 | 1.3 | 1.4 |
|  | A19 | 19 | 90 | 0.3 | 2.7 | 1.2 | 0.01 | 0.001 | 0.017 | 2.4 | 0.9 |
|  | A20 | 20 | 64 | 0.2 | 1.1 | 0.5 | 0.13 | 0.031 | 0.008 | 27.5 | 2.0 |
|  | A21 | 21 | 91 | 0.5 | 2.1 | 1.0 | 0.01 | 0.001 | 0.015 | 1.7 | 0.8 |
|  | A22 | 22 | 77 | 0.1 | 4.9 | 2.3 | 0.03 | <0.002 | 0.026 | 7.1 | 0.9 |
|  | A23 | 23 | 87 | 0.2 | 1.4 | 0.7 | 0.04 | 0.002 | 0.056 | 7.6 | 1.7 |
| Related-art Example | A24 | 24 | 96 | 0.7 | 1.2 | 0.6 | 0.03 | 0.020 | 0.002 | 0.3 | <0.05 |
|  | A25 | 25 | 97 | 0.8 | 0.5 | 0.2 | 0.03 | 0.005 | 0.023 | 0.3 | 0.1 |
|  | A26 | 26 | 98 | 0.6 | 1.7 | 0.8 | 0.04 | 0.040 | 0.051 | 0.3 | 0.2 |
|  | A27 | 27 | 98 | <0.05 | <0.01 | <0.01 | 0.01 | <0.002 | <0.001 | <0.05 | <0.05 |
| Comparative Example | A28 | 28 | 84 | 0.5 | 2.5 | 1.2 | 0.05 | 0.023 | 0.045 | 11.5 | 0.8 |
|  | A29 | 29 | 79 | 0.1 | 4.6 | 2.2 | 0.02 | <0.002 | 0.018 | 6.2 | 4.9 |
|  | A30 | 30 | 95 | 0.8 | 1.1 | 0.5 | 0.04 | 0.020 | 0.008 | 0.9 | 0.3 |
|  | A31 | 31 | 59 | 0.2 | 0.7 | 0.3 | 0.08 | 0.014 | 0.014 | 24.6 | 0.6 |
|  | A32 | 32 | 67 | 0.3 | 0.5 | 0.2 | 0.08 | 0.030 | 0.015 | 24.5 | 0.5 |

TABLE 2

|  | No. | Titanium oxide raw material | Al | K | Na | V | Nb | Sn | Mg | Ca | Cr |
|---|---|---|---|---|---|---|---|---|---|---|---|
| Example | A1 | 1 | 1.0 | 0.02 | 0.01 | 0.1 | 0.1 | <0.05 | 0.2 | 0.1 | <0.05 |
|  | A2 | 2 | 0.9 | 0.01 | 0.01 | 0.1 | <0.05 | <0.05 | 0.4 | 0.1 | <0.05 |
|  | A3 | 3 | 0.4 | 0.01 | 0.02 | 0.1 | 0.1 | <0.05 | 0.5 | 0.3 | 0.2 |
|  | A4 | 4 | 0.9 | 0.02 | 0.01 | 0.4 | 0.1 | <0.05 | 0.7 | 0.2 | <0.05 |
|  | A5 | 5 | 0.3 | 0.02 | 0.01 | 0.1 | 0.1 | <0.05 | 0.1 | 0.2 | <0.05 |
|  | A6 | 6 | 0.5 | 0.02 | 0.02 | 0.2 | 0.1 | <0.05 | 0.8 | 0.8 | <0.05 |
|  | A7 | 7 | 0.8 | 0.02 | 0.05 | 0.1 | <0.05 | <0.05 | 0.2 | 0.1 | 0.1 |
|  | A8 | 8 | 0.6 | 0.02 | 0.01 | 0.2 | <0.05 | <0.05 | 0.6 | 0.2 | <0.05 |
|  | A9 | 9 | 0.8 | 0.02 | 0.01 | 0.1 | 0.1 | <0.05 | 0.2 | 0.1 | <0.05 |
|  | A10 | 10 | 0.6 | 0.03 | 0.01 | 0.1 | <0.05 | <0.05 | 0.1 | 0.1 | <0.05 |
|  | A11 | 11 | 0.5 | 0.01 | 0.02 | 0.2 | 0.1 | <0.05 | 0.3 | 0.1 | 0.2 |
|  | A12 | 12 | 0.9 | 0.01 | 0.01 | 0.1 | <0.05 | <0.05 | 0.2 | 0.6 | <0.05 |
|  | A13 | 13 | 0.6 | 0.01 | 0.03 | 0.1 | 0.1 | <0.05 | 0.2 | 0.1 | 0.1 |
|  | A14 | 14 | 0.7 | 0.01 | 0.00 | 0.1 | 0.1 | <0.05 | 0.2 | <0.001 | <0.05 |
|  | A15 | 15 | 0.9 | 0.02 | 0.01 | 0.1 | 0.1 | <0.05 | 0.3 | 0.1 | 0.1 |
|  | A16 | 16 | 0.8 | 0.01 | 0.01 | 0.1 | <0.05 | <0.05 | 0.4 | 0.2 | <0.05 |
|  | A17 | 17 | 0.8 | 0.02 | 0.01 | 0.1 | 0.1 | <0.05 | 0.9 | 0.3 | <0.05 |
|  | A18 | 18 | 0.8 | 0.01 | 0.01 | <0.05 | <0.05 | <0.05 | 0.3 | 0.1 | <0.05 |
|  | A19 | 19 | 0.7 | 0.02 | 0.01 | 0.1 | 0.1 | <0.05 | 0.5 | 0.1 | <0.05 |
|  | A20 | 20 | 0.6 | 0.01 | 0.01 | 0.1 | 0.1 | <0.05 | 0.1 | 0.2 | 0.1 |
|  | A21 | 21 | 0.5 | 0.02 | 0.01 | 0.1 | <0.05 | <0.05 | 0.8 | 0.8 | <0.05 |
|  | A22 | 22 | 1.0 | 0.06 | 0.14 | 0.1 | <0.05 | <0.05 | 3.9 | 0.4 | 0.2 |
|  | A23 | 23 | 0.6 | 0.03 | 0.02 | 0.2 | 0.1 | <0.05 | 0.4 | 0.1 | 0.2 |
| Related-art Example | A24 | 24 | 0.0 | 0.02 | 0.00 | 0.3 | 0.2 | <0.05 | <0.05 | <0.05 | 0.2 |
|  | A25 | 25 | 0.1 | <0.001 | <0.001 | 0.4 | 0.2 | <0.05 | <0.05 | <0.05 | 0.1 |
|  | A26 | 26 | 0.0 | 0.01 | 0.04 | 0.3 | 0.1 | <0.05 | <0.05 | <0.05 | <0.05 |
|  | A27 | 27 | 0.7 | 0.00 | 0.02 | <0.05 | <0.05 | <0.05 | <0.05 | <0.05 | <0.05 |
| Comparative Example | A28 | 28 | 0.5 | 0.00 | 0.00 | <0.05 | <0.05 | <0.05 | <0.05 | <0.05 | <0.05 |
|  | A29 | 29 | 1.0 | 0.05 | 0.16 | 0.1 | 0.2 | <0.05 | 1.3 | 0.2 | 0.1 |
|  | A30 | 30 | 0.2 | 0.00 | 0.01 | 0.2 | 0.3 | <0.05 | 0.4 | <0.05 | 0.1 |
|  | A31 | 31 | 0.0 | 0.00 | 0.08 | 0.1 | <0.05 | <0.05 | 0.8 | 0.1 | <0.05 |
|  | A32 | 32 | 1.3 | 0.02 | 0.02 | 0.2 | 0.1 | <0.05 | 0.2 | 0.2 | 0.2 |

A titanium oxide raw material was produced by employing the firing method or the melting method described below. After that, if the contents of trace elements such as Fe, Mn, Al, Si, Mg, and Ca that are present at the surface need to be adjusted, for example, oxides (including composite oxides) and carbonates of Fe, Mn, Al, Si, Mg, and Ca may be added and fired (sintered) to a degree that the surface of the titanium oxide raw material is slightly melted. The firing temperature is about 800° C. to 1300° C., though depending on the content of oxygen in the titanium oxide raw material and the firing method. The titanium oxide raw material is sintered together with the additive raw materials in a rotary kiln, a butch furnace, or the like. Fe, Mn, Al, Si, Mg, and Ca may be added in the form of metal because they are readily oxidized.

A method for producing a titanium oxide raw material will now be described. First, a firing method is described. Natural rutile, leucoxene, and ilmenite were used as raw materials for Ti sources. The Ti content of each raw material decreases in the order of rutile, leucoxene, and ilmenite, and rutile, leucoxene, and ilmenite are properly used as a mixture depending on the intended physical properties of the titanium oxide raw material. In general, a raw material having a high Ti content is preferably used for vertical welding and a raw material having a low Ti content is preferably used for fillet welding. To use a raw material containing a smaller amount of impurities, gravity separation, magnetic separation, and flotation for concentrating the titanium oxide raw material and reducing the amount of impurities were performed. The Si, Al, Fe, Mn, Mg, and Ca sources may be oxides or carbonates of Si, Al, Fe, Mn, Mg, and Ca. However, as represented by ilmenite, a composite oxide of the oxides of such elements and the titanium oxide raw material was also used. The composite oxide has a lower melting point than the oxides and carbonates and thus is advantageous to a surface reaction. Thus, the reaction can be caused to proceed at a lower temperature.

In the firing method, a rotary kiln and a batch furnace are exemplified as a firing furnace. In consideration of an effective reaction between the titanium oxide source and other oxides or carbonates, a rotary kiln in which the raw materials uniformly contact each other is preferably used. In a butch furnace, if the firing temperature is 1200° C. or more, part or the entirety of a mixture raw material having a low melting point is highly likely to be sintered and solidified. Therefore, extra processes such as coarse grinding, crushing, and screening are performed on the sintered and solidified titanium oxide raw material, which increases the cost. Regarding the firing atmosphere, if the firing is performed in an air atmosphere at a high firing temperature, titanium nitride (melting point 3000° C.) is believed to be formed. Therefore, a CO atmosphere is recommended as the firing atmosphere. A CO gas is easily generated by adding a C source to the raw material to be fired. In the case where ilmenite is used as a Ti source, a large amount of C source is added to reduce iron oxide that is present at surfaces of ilmenite particles and constitutes the ilmenite, for the purpose of increasing the apparent melting point of the ilmenite. This is specifically described with reference to FIG. 3. The composition at the surface of each ilmenite particle is shifted from ilmenite toward natural rutile to increase the melting point at the surface of each ilmenite particle. Herein, the central part of each ilmenite particle is not necessarily reduced.

A melting method will now be described. Natural ilmenite, which is an inexpensive material, was used as a raw material for Ti sources, but rutile or leucoxene can also be used. To use a raw material containing a smaller amount of impurities, gravity separation, magnetic separation, and flotation for concentrating the titanium oxide raw material and reducing the amount of impurities were performed. The Si, Al, Fe, Mn, Mg, and Ca sources may be oxides or carbonates of Si, Al, Fe, Mn, Mg, and Ca. However, as represented by ilmenite, a composite oxide of the oxides of such elements and the titanium oxide raw material was also used. The composite oxide has a lower melting point than the oxides and carbonates and thus is advantageous to a surface reaction. Thus, the reaction can be caused to proceed at a lower temperature.

In the melting method, when ilmenite, other raw materials (oxides, carbonates), and a deoxidizer (C source) are mixed (may be formed into a pellet) and heated to 1800° C. to 2000° C. in an arc furnace or a high-frequency furnace, iron oxide in the ilmenite is reduced so as to have a molten state. Since Fe has a low melting point, Fe is concentrated in a lower portion of the furnace. In an upper portion of the furnace, oxides and/or composite oxides of Ti, Si, Al, Mn, Fe, Mg, Ca, and other impurities are produced.

The thus-obtained oxides and/or composite oxides are subjected to coarse grinding, crushing, and particle size adjustment to produce a solvent raw material. Herein, a mixture of an Fe portion (lower portion) having a low melting point and an oxide and/or composite oxide portion (upper portion) having a high melting point may be used or an intermediate layer (having a melting point between those of the upper portion and lower portion) may be used depending on the required properties (bead shape) of the welding material and the welding usage such as vertical up welding or fillet welding.

In the cases of the firing method and melting method, C and S in the deoxidizer may remain in the titanium oxide raw material. These impurities adversely affect the quality of the welding material, and thus a post-treatment (pickling or firing treatment) that is dependent on the types of impurities needs to be performed.

In the melting method, the valence number (degree of oxidation) in the air of Ti in the oxides and/or composite oxides is not stable. Therefore, firing is sometimes performed in the air (a CO reducing atmosphere in a molten state) to provide tetravalent titanium (crystal structure of $TiO_2$), which is the most stable form.

Regarding the titanium oxide raw material itself (sample (1)) and a titanium oxide raw material taken out of a trial welding material, whether the same analysis results are obtained was confirmed with EDX.

For example, in the case of a flux-cored wire, a flux is taken out of a drawn wire (wire diameter=1.2 mm) and subjected to ultrasonic cleaning with distilled water and ethanol. Subsequently, the flux is classified in terms of particle size by performing filtration. Metals are then removed by magnetic separation and the remaining product is defined as a sample (2). In this case, other flux raw materials may adhere to the surface of the titanium oxide raw material. Therefore, a region in which no foreign substances (e.g., raw materials other than titanium oxide raw material) adhere to the surface is set to be an analysis region, if necessary, by increasing the magnification to 5000 to 10000 times in order to further improve the analytical precision. The measurement region herein is not necessarily the above-described rectangular region with a size of 10 μm×10 μm.

Table 3 shows the EDX analysis results at surfaces of the raw material particles. Table 4 shows the EDX analysis results at surfaces of the raw material particles of the prepared samples in Examples A1, A2, A3, and A24 that respectively use the titanium oxide raw materials 1, 2, 3, and 24 shown in Table 3.

TABLE 3

|  | No. | Titanium oxide raw material | Ti | O | Fe | Mn | Fe + Mn | Si | Al |
|---|---|---|---|---|---|---|---|---|---|
| Example | A1 | 1 | 33.7 | 57.6 | 2.7 | 2.5 | 5.2 | 2.7 | 1.3 |
|  | A2 | 2 | 35.5 | 59.5 | 0.6 | 0.7 | 1.3 | 0.2 | 3.1 |
|  | A3 | 3 | 37.1 | 48.9 | 10.8 | 0.8 | 11.6 | 1.0 | 1.3 |
|  | A4 | 4 | 32.4 | 64.5 | 0.7 | 0.3 | 1.0 | 0.2 | 1.6 |
|  | A5 | 5 | 24.2 | 60.5 | 11.9 | 0.2 | 12.1 | 1.5 | 1.5 |
|  | A6 | 6 | 34.8 | 60.3 | 2.4 | 0.5 | 2.9 | 0.6 | 0.5 |
|  | A7 | 7 | 43.2 | 54.9 | 0.3 | 0.6 | 0.9 | 0.8 | 0.4 |
|  | A8 | 8 | 45.5 | 49.5 | 0.2 | 0.3 | 0.5 | 3.5 | 1.2 |
|  | A9 | 9 | 37.4 | 57.8 | 2.5 | 0.9 | 3.4 | 0.3 | 5.1 |
|  | A10 | 10 | 31.2 | 55.3 | 7.4 | 0.4 | 7.8 | 2.3 | 4.1 |
|  | A11 | 11 | 22.5 | 70.2 | 0.0 | 0.9 | 0.9 | 4.5 | 3.0 |
|  | A12 | 12 | 37.8 | 54.6 | 0.1 | 0.5 | 0.6 | 1.6 | 6.1 |
|  | A13 | 13 | 78.2 | 4.6 | 1.8 | 0.5 | 2.3 | 5.6 | 2.4 |
|  | A14 | 14 | 17.6 | 70.4 | 0.8 | 1.4 | 2.2 | 5.3 | 3.0 |
|  | A15 | 15 | 70.4 | 20.8 | 0.2 | 0.6 | 0.8 | 6.7 | 2.3 |
|  | A16 | 16 | 46.5 | 44.5 | 0.0 | 0.5 | 0.5 | 3.1 | 6.0 |
|  | A17 | 17 | 23.1 | 67.2 | 0.4 | 0.3 | 0.7 | 2.9 | 6.6 |
|  | A18 | 18 | 45.0 | 55.0 | 0.4 | 0.1 | 0.5 | 1.3 | 0.2 |
|  | A19 | 19 | 30.4 | 62.0 | 0.1 | 0.3 | 0.4 | 4.2 | 1.7 |
|  | A20 | 20 | 13.2 | 76.8 | 0.6 | 0.0 | 0.6 | 4.3 | 5.5 |
|  | A21 | 21 | 74.8 | 23.6 | 0.3 | 0.1 | 0.4 | 0.9 | 0.8 |
|  | A22 | 22 | 75.3 | 22.5 | 0.3 | 0.0 | 0.3 | 1.1 | 1.2 |
|  | A23 | 23 | 83.2 | 8.0 | 0.5 | 0.3 | 0.8 | 6.9 | 1.2 |
| Related-art Example | A24 | 24 | 43.8 | 55.9 | 0.0 | 0.0 | 0.0 | 0.1 | 0.2 |
|  | A25 | 25 | 42.1 | 57.3 | 0.3 | 0.0 | 0.3 | 0.1 | 0.1 |
|  | A26 | 26 | 44.5 | 55.1 | 0.2 | 0.0 | 0.2 | 0.1 | 0.1 |
|  | A27 | 27 | 41.2 | 58.0 | 0.1 | 0.1 | 0.2 | 0.0 | 0.6 |
| Comparative Example | A28 | 28 | 22.2 | 67.0 | 0.1 | 0.1 | 0.2 | 3.4 | 7.1 |
|  | A29 | 29 | 30.6 | 55.2 | 0.2 | 0.1 | 0.3 | 7.4 | 6.4 |
|  | A30 | 30 | 47.2 | 40.8 | 0.1 | 0.3 | 0.4 | 5.1 | 6.8 |
|  | A31 | 31 | 0.6 | 66.0 | 0.1 | 0.5 | 0.6 | 12.8 | 19.6 |
|  | A32 | 32 | 54.9 | 31.8 | 0.2 | 0.1 | 0.3 | 5.7 | 7.2 |

TABLE 4

| Titanium oxide raw material | | O | Fe | Mn | Fe + Mn | Ti | Si | Al | Si + Al | Ti/Fe + Mn | O/Fe + Mn |
|---|---|---|---|---|---|---|---|---|---|---|---|
| 1 | Raw material itself | 57.6 | 2.7 | 2.5 | 5.2 | 33.7 | 2.7 | 1.3 | 4.0 | 6 | 11 |
|  | Flux taken out of wire | 38.3 | 1.2 | 4.3 | 5.5 | 39.8 | 2.2 | 0.8 | 3.0 | 7 | 7 |
| 2 | Raw material itself | 59.5 | 0.6 | 0.7 | 1.3 | 35.5 | 0.2 | 3.1 | 3.3 | 27 | 46 |
|  | Flux taken out of wire | 55.4 | 0.6 | 2.3 | 2.9 | 38.7 | 1.8 | 0.8 | 2.6 | 13 | 19 |
| 3 | Raw material itself | 48.9 | 10.8 | 0.8 | 11.6 | 37.1 | 1.0 | 1.3 | 2.3 | 3 | 4 |
|  | Flux taken out of wire | 51.6 | 5.3 | 3.1 | 8.4 | 35.2 | 0.5 | 1.5 | 2.0 | 4 | 6 |
| 24 | Raw material itself | 55.9 | 0.0 | 0.0 | 0.0 | 43.8 | 0.1 | 0.2 | 0.3 | ∞ | ∞ |
|  | Flux taken out of wire | 34.9 | 0.0 | 0.0 | 0.0 | 64.8 | 0.0 | 0.1 | 0.1 | ∞ | ∞ |

As shown in Tables 3 and 4, the values of the mathematical formulae 1, 2, and 3 calculated from the EDX analysis results are substantially the same regardless of the methods for preparing the samples.

Figure 8:
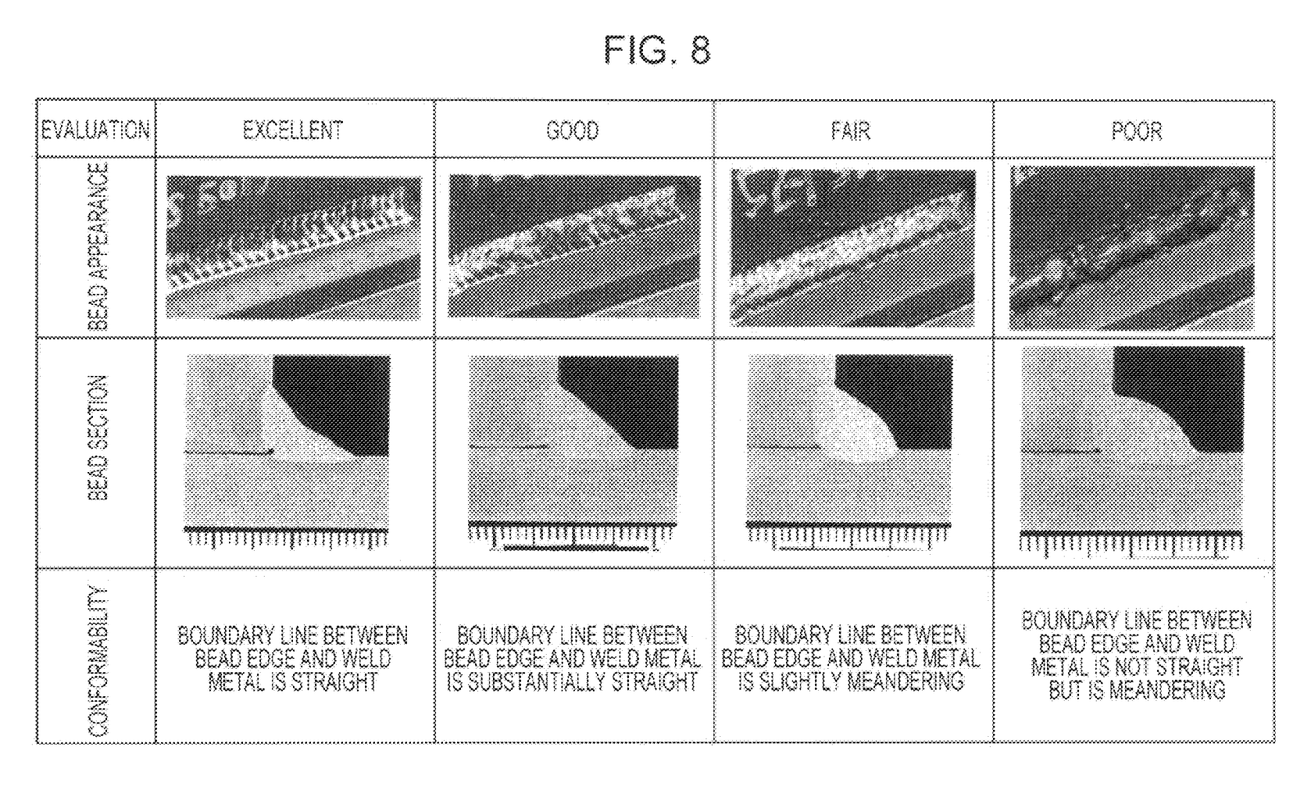
FIG. 8 shows the evaluation criteria for a bead shape and the conformability in use of a flux-cored wire.

Table 5 shows the evaluation results of a welding test performed using titanium oxide raw materials for flux-cored wires and covered electrodes. FIG. 8 shows the evaluation criteria for conformability and a bead shape. An overall evaluation of "Excellent" was given when both the conformability and bead shape were "Excellent". An overall evaluation of "Good" was given when one of the conformability and bead shape was "Excellent" and the other was "Good". An overall evaluation of "Fair" was given when both the conformability and bead shape were "Fair". An overall evaluation of "Poor" was given when one of the conformability and bead shape was "Poor". Note that Table 5 shows the results of the welding test with both the flux-cored wire and covered electrode, and the results of the conformability and bead shape are the same in both the flux-cored wire and covered electrode.

TABLE 5

| | No. | Si + Al | Ti/Fe + Mn | O/Fe + Mn | Conformability | Bead shape | Overall evaluation |
|---|---|---|---|---|---|---|---|
| Example | A1 | 4.0 | 6 | 11 | Excellent | Excellent | Excellent |
| | A2 | 3.4 | 27 | 46 | Excellent | Excellent | Excellent |
| | A3 | 2.3 | 3 | 4 | Excellent | Excellent | Excellent |
| | A4 | 1.8 | 32 | 65 | Excellent | Excellent | Excellent |
| | A5 | 3.0 | 2 | 5 | Excellent | Excellent | Excellent |
| | A6 | 1.1 | 12 | 21 | Good | Excellent | Good |
| | A7 | 1.2 | 48 | 61 | Good | Excellent | Good |
| | A8 | 4.7 | 91 | 99 | Excellent | Excellent | Excellent |
| | A9 | 5.4 | 11 | 17 | Excellent | Excellent | Excellent |
| | A10 | 6.4 | 4 | 7 | Good | Excellent | Good |
| | A11 | 7.5 | 25 | 78 | Good | Excellent | Good |
| | A12 | 7.7 | 63 | 91 | Good | Excellent | Good |
| | A13 | 8.0 | 34 | 2 | Good | Excellent | Good |
| | A14 | 8.3 | 8 | 32 | Good | Excellent | Good |
| | A15 | 9.0 | 88 | 26 | Good | Excellent | Good |
| | A16 | 9.1 | 93 | 89 | Good | Excellent | Good |
| | A17 | 9.5 | 33 | 96 | Good | Excellent | Good |
| | A18 | 1.5 | 90 | 110 | Excellent | Good | Good |
| | A19 | 5.9 | 76 | 155 | Excellent | Good | Good |
| | A20 | 9.8 | 22 | 128 | Good | Good | Good |
| | A21 | 1.7 | 187 | 59 | Excellent | Good | Good |
| | A22 | 2.3 | 251 | 75 | Excellent | Good | Good |
| | A23 | 8.1 | 104 | 10 | Good | Good | Good |
| Related-art Example | A24 | 0.4 | ∞ | ∞ | Fair | Poor | Poor |
| | A25 | 0.2 | 140 | 191 | Fair | Poor | Poor |
| | A26 | 0.2 | 223 | 276 | Fair | Poor | Poor |
| | A27 | 0.7 | 206 | 290 | Fair | Poor | Poor |
| Comparative Example | A28 | 10.5 | 111 | 335 | Fair | Fair | Fair |
| | A29 | 13.8 | 102 | 184 | Fair | Fair | Fair |
| | A30 | 11.9 | 118 | 102 | Fair | Fair | Fair |
| | A31 | 32.4 | 1 | 110 | Fair | Fair | Fair |
| | A32 | 12.9 | 183 | 106 | Fair | Fair | Fair |

The flux-cored wire and covered electrode were produced using the titanium oxide raw materials shown in Tables 1 to 3. Table 6 shows the contents of components other than the titanium oxide raw material. Table 7 shows the welding conditions.

TABLE 6

| | | | Amount of raw material added (mass % in flux) | | | |
|---|---|---|---|---|---|---|
| | Size (diameter, mm) | Usage | Titanium oxide raw material | Fe powder | Fe—Mn | Fe—Si |
| Flux-cored wire | 1.2 | all positions | 40 to 60 | 20 to 1 | 22 | 6 |
| Covered electrode | 4.0 | all positions | 6 | — | 3 | 13 |

| | Amount of raw material added (mass % in flux) | | | | | |
|---|---|---|---|---|---|---|
| Type | Al | Al—Mg | Silicon sand | Potassium feldspar | Fluorspar | Barium carbonate |
| Flux-cored wire | 1.5 | 1.5 | 3 | 4 | — | — |

TABLE 6-continued

| | | | | | | |
|---|---|---|---|---|---|---|
| Covered electrode | — | — | — | — | 16 | 3.5 |

TABLE 7

| | Welding conditions | | | | | |
|---|---|---|---|---|---|---|
| Type | Welding position | Welding current | Arc voltage | Welding speed | Weaving | Type and flow rate of shielding gas |
| Flux-cored wire | Vertical up fillet | about 220 (A) | about 26 (V) | 11 (cm/min) (constant speed) | Yes | 100% $CO_2$ 25 (liter/min) |
| Covered electrode | Vertical up fillet | about 150 | about 22 | about 5 to 10 | Yes | — |

As shown in Table 5, Examples A1 to A5, A8, and A9 of the present invention satisfy all the requirements of Claims 1 to 3 of the present invention. Therefore, both the conformability of a bead and the bead shape are excellent, whereby an overall evaluation of Excellent is given. Examples A6, A7, and A10 to A17 satisfy the requirements of Claims 1 and 3 of the present invention, but fall outside the scope of Claim 2. Thus, the conformability is slightly poor and an overall evaluation of Good is given. Examples A18 to A23 do not satisfy the requirement of Claim 3. Thus, the bead shape or the conformability is slightly poor and an overall evaluation of Good is given. Examples A1 to A23 do not have an evaluation of Fair or Poor in terms of the conformability of a bead and the bead shape and thus an overall evaluation of Excellent or Good is given. In contrast, in Comparative Examples A28 to A32 and Related-art Examples A24 to A27 that fall outside the scope of Claims 1 to 3 of the present invention, the conformability or the bead shape is poor.

Example B

Examples of submerged arc welding will now be described in comparison with Comparative Examples thereof. Sintered fluxes for submerged arc welding each having a flux composition shown in Table 8 were produced by an ordinary method from the titanium oxide raw materials each having the bulk composition and surface atomic percentage in Tables 1 to 3. Note that the titanium oxide raw material No. shown in Table 8 corresponds to the number of the titanium oxide raw material shown in Tables 1 to 3. The amount of water glass added was 13 mL per 100 g of raw material flux. A granular flux was fired at 450° C. for two hours. The particle size of a product flux was adjusted to 12×65 mesh.

The welding workability was investigated using the sintered fluxes for submerged arc welding produced as described above. To evaluate the welding workability, the bead shape (stability of bead width) and the presence or absence of pockmarks were investigated. The electric current stability during welding was also investigated at the same time. The stability of bead width was evaluated based on the stability of welding current (the range of fluctuation of electric current). Table 9 shows the evaluation results. Herein, the welding conditions were AC 700 A, 32 V, and 40 cpm. US36 with a diameter of 4.0 mm was used as a wire. The test steel sheet was SM41B. The welding method was a bead-on-plate method. Regarding the stability of welding current in Table 9, an evaluation of "Excellent" was given when the welding current was within the range of 700 A±15 A, an evaluation of "Good" was given when the welding current was within the range of 700 A±30 A, and an evaluation of "Poor" was given when the welding current was outside the range of 700 A±30 A. Regarding the pockmark, an evaluation of "Excellent" was given when the number of pockmarks per a bead length of 1 m was zero, an evaluation of "Good" was given when the number of pockmarks per a bead length of 1 m was two or less, and an evaluation of "Poor" was given when the number of pockmarks per a bead length of 1 m was three or more. Herein, the evaluation at the start of welding and the end of welding was exempted.

TABLE 8

| | | Titanium oxide No. | Amount of titanium oxide blended | CaO | $SiO_2$ | MgO | $Al_2O_3$ | $CaF_2$ | $CO_2$ | Others |
|---|---|---|---|---|---|---|---|---|---|---|
| Example | B1 | 1 | 13 | 10 | 21 | 18 | 23 | 9 | 4 | 2 |
| | B2 | 6 | | | | | | | | |
| | B3 | 9 | | | | | | | | |
| | B4 | 10 | | | | | | | | |
| | B5 | 14 | | | | | | | | |
| | B6 | 17 | | | | | | | | |
| | B7 | 20 | | | | | | | | |
| | B8 | 21 | | | | | | | | |
| | B9 | 23 | | | | | | | | |

TABLE 8-continued

| | Titanium oxide No. | Amount of titanium oxide blended | CaO | SiO$_2$ | MgO | Al$_2$O$_3$ | CaF$_2$ | CO$_2$ | Others |
|---|---|---|---|---|---|---|---|---|---|
| Related-art | B10 | 24 | | | | | | | |
| Example | B11 | 25 | | | | | | | |
| Comparative | B12 | 28 | | | | | | | |
| Example | B13 | 31 | | | | | | | |

TABLE 9

| | | Bead shape | Stability of welding current | Pockmark | Evaluation |
|---|---|---|---|---|---|
| Example | B1 | Excellent | Excellent | Excellent | Excellent |
| | B2 | Excellent | Excellent | Excellent | Excellent |
| | B3 | Excellent | Excellent | Excellent | Excellent |
| | B4 | Good | Good | Good | Good |
| | B5 | Good | Good | Good | Good |
| | B6 | Good | Good | Good | Good |
| | B7 | Good | Good | Good | Good |
| | B8 | Good | Good | Good | Good |
| | B9 | Good | Good | Good | Good |
| Related-art | B10 | Poor | Poor | Poor | Poor |
| Example | B11 | Poor | Poor | Poor | Poor |
| Comparative | B12 | Poor | Poor | Poor | Poor |
| Example | B13 | Poor | Poor | Poor | Poor |

As shown in Table 9, in Examples B1 to B9 in which the composition of the titanium oxide raw material satisfies the requirement of Claim 1 of the present invention, a good bead shape is obtained and thus an evaluation of Excellent or Good is given. In Examples B1 to B3 in which the composition satisfies all the requirements of Claims 1 to 3 of the present invention, a particularly good bead shape is obtained and thus an evaluation of Excellent is given. In contrast, in Related-art Examples B10 and B11 and Comparative Examples B12 and B13 that respectively use the titanium oxide raw material Nos. 24, 25, 28, and 31 in Tables 1 to 3, satisfactory results are not obtained in terms of the bead shape, the stability of welding current, and the presence or absence of pockmarks and thus an evaluation of Poor is given.

The invention claimed is:

1. A particulate titanium oxide raw material, comprising relative to the total mass of the titanium oxide raw material:
   from 58.0% to 99.0% by mass of TiO$_2$;
   2.5% by mass or less of Si;
   3.0% by mass or less of Al;
   5.0% by mass or less of Mn;
   35.0% by mass or less of Fe;
   5.0% by mass or less of Mg; and
   2.0% by mass or less of Ca,
   wherein a surface of each particle comprises a composite oxide comprising Al and Si such that atomic percentages of Al and Si in the composite oxide satisfy the following formula:

$1 \leq Al+Si \leq 10$.

2. The titanium oxide raw material of claim 1, wherein atomic percentages of Al and Si in the composite oxide satisfy $1.5 \leq Al+Si \leq 6$.

3. The titanium oxide raw material of claim 1, wherein atomic percentages of Ti, Fe, Mn, and O in the composite oxide satisfy the following formulae:

$1 < Ti/(Fe+Mn) \leq 100$; and $O/(Fe+Mn) \leq 100$.

4. The titanium oxide raw material of claim 2, wherein atomic percentages of Ti, Fe, Mn, and O in the composite oxide satisfy the following formulae:

$1 < Ti/(Fe+Mn) \leq 100$; and $O/(Fe+Mn) \leq 100$.

* * * * *